(12) United States Patent
Spitsberg et al.

(10) Patent No.: US 6,383,306 B1
(45) Date of Patent: May 7, 2002

(54) PREPARATION OF A NICKEL-BASE SUPERALLOY ARTICLE HAVING A DECARBURIZED COATING CONTAINING ALUMINUM AND A REACTIVE ELEMENT

(75) Inventors: Irene T. Spitsberg, Loveland; Jeffrey A. Pfaendtner, Blue Ash; Joseph D. Rigney, Milford, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/513,871

(22) Filed: Feb. 28, 2000

(51) Int. Cl.[7] ................................................ C23C 28/02
(52) U.S. Cl. ...................... 148/208; 148/220; 148/518; 148/535
(58) Field of Search ................................. 148/208, 220, 148/518, 535, 537

(56) References Cited

U.S. PATENT DOCUMENTS

| | | | |
|---|---|---|---|
| 5,556,484 A | * 9/1996 | Blankenship et al. | ....... 148/211 |
| 5,667,663 A | * 9/1997 | Rickerby et al. | ........... 148/518 |
| 5,716,720 A | * 2/1998 | Murphy | ....................... 148/537 |
| 5,942,337 A | * 8/1999 | Rickerby et al. | ........... 148/537 |

* cited by examiner

Primary Examiner—George Wyszomierski
(74) Attorney, Agent, or Firm—David L. Narciso; Gregory O. Garmong

(57) ABSTRACT

A nickel-base superalloy article substrate has more nickel than any other element and a nominal bulk composition of carbon. A protective layer is deposited overlying the surface of the article substrate. The protective layer includes aluminum and one or more of the reactive elements hafnium, zirconium, yttrium, lanthanum, and cerium. The depositing of the protective layer includes steps of decarburizing locations where the carbon may serve as a barrier to the mobility of the reactive elements within the protective layer, and depositing an aluminum-containing protective layer overlying the substrate. The decreasing of the carbon concentration may be accomplished. by decarburizing the substrate, depositing a platinum-containing layer and then decarburizing, depositing an aluminum-containing layer in a reducing atmosphere, and/or decarburizing the deposited protective layer. A ceramic thermal barrier coating may be deposited overlying the protective layer.

7 Claims, 3 Drawing Sheets

PREPARATION OF A NICKEL-BASE SUPERALLOY ARTICLE HAVING A DECARBURIZED COATING CONTAINING ALUMINUM AND A REACTIVE ELEMENT

This invention relates to a nickel-base superalloy article having a protective layer containing aluminum and a reactive element deposited on its surface, with the carbon content reduced by decarburizing.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan blades. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1800–2100° F.

Many approaches have been used to protect the turbine blades and vanes against the highly aggressive combustion-gas environment and to increase the operating temperature limit of the turbine blades and vanes. For example, the composition and processing of the base materials themselves have been improved. Physical cooling techniques may also be used.

In another approach, the surfaces of the turbine blades and vanes are coated with aluminum-containing protective coatings that protect the articles against the combustion gas, and in some cases insulate the articles from the temperature of the combustion gas. The articles are thereby able to run cooler and be more resistant to environmental attack.

The addition of selected elements to the protective coatings may improve the mechanical and environmental properties of the coatings. However, those results have not always been consistent, and there is a large scatter in the data. Even though there has been an indication of improved performance as a result of the presence of such elements, those improvements cannot be relied upon in all cases.

There is a need for an approach to improving the properties obtained in nickel-base superalloys having a protective coating. The present invention fulfills this need, and further provides related advantages.

BRIEF SUMMARY OF THE INVENTION

The present invention provides a procedure that improves the performance of a nickel-base superalloy having a protective coating applied to its surface, and an article having this improved performance. The protective coating contains aluminum and a reactive element such as hafnium, zirconium, yttrium, lanthanum, and/or cerium. The procedure is readily performed with available apparatus, and may be integrated into the coating process. The coating protects the surface of the article against environmental damage, as in the case of conventional protective coatings.

A method for preparing a surface-protected article includes providing an article substrate having a surface and having a nominal bulk composition comprising a nickel-base superalloy. The nickel-base superalloy has more nickel than any other element, and a nominal bulk composition of carbon. The method further includes depositing a protective layer overlying the surface of the article substrate, wherein the protective layer comprises aluminum and a reactive element selected from the group consisting of hafnium, zirconium, yttrium, lanthanum, and cerium, and combinations thereof. The step of depositing a protective layer includes the steps of decarburizing locations where the carbon may serve as a barrier to the mobility of the reactive elements within the protective layer by scavenging the reactive elements and preventing their diffusion in the protective layer, and depositing the protective layer overlying the substrate. The protective layer may be an overlay coating or a diffusion coating. A ceramic layer may be deposited over the protective layer.

The reactive elements (hafnium, zirconium, yttrium, lanthanum, and cerium, and combinations thereof) present in the protective layer yield their greatest benefits when they are in solid solution and free to diffuse within the coating. The impurity element carbon chemically combines with the reactive elements to form compounds that remove the reactive elements from solid solution and thence prevent them from moving within the protective layer. The result is that their advantageous effects are reduced or lost. In the present approach, the carbon which may chemically combine with the reactive elements of the protective layer is partially removed so as to lessen its concentration. The carbon is preferably removed not only from the protective layer itself, but also from the surface region of the substrate, because it may diffuse from the substrate into the protective layer during service.

In practicing the method, the reducing of the carbon content is preferably accomplished by contacting a decarburizing agent to the surface of the substrate to decarburize to a depth of from about 5 to about 100 micrometers, decarburizing a platinum-containing layer after deposition (where the protective layer is a platinum aluminide), depositing the aluminum-containing layer from an atmosphere containing a reducing agent, and/or decarburizing the substrate and protective layer after it is deposited. The decarburizing agent is preferably a reducing gas such as hydrogen or carbon dioxide. Particularly in the case of the overlay protective layer, the starting materials of the protective layer may be decarburized prior to deposition.

The present approach provides a low-carbon region in the protective layer and in the substrate adjacent to the surface where the protective layer is deposited. The low carbon content of the protective layer results in the reactive elements not chemically combining with carbon to produce carbides of the reactive elements, so that the reactive elements remain free to diffuse throughout the protective layer. Such carbides reduce the level of the solute reactive element that is available to strengthen and improve the environmental properties of the coating. However, it is desirable to remove carbon from the surface region of the substrate as well, so that this surface region cannot serve as a diffusion source of carbon into the protective layer during service. The result is improved performance of the coating during service.

Other features and advantages of the present invention will be apparent from the following more detailed descrip-

DETAILED DESCRIPTION OF THE INVENTION

Figure 1:
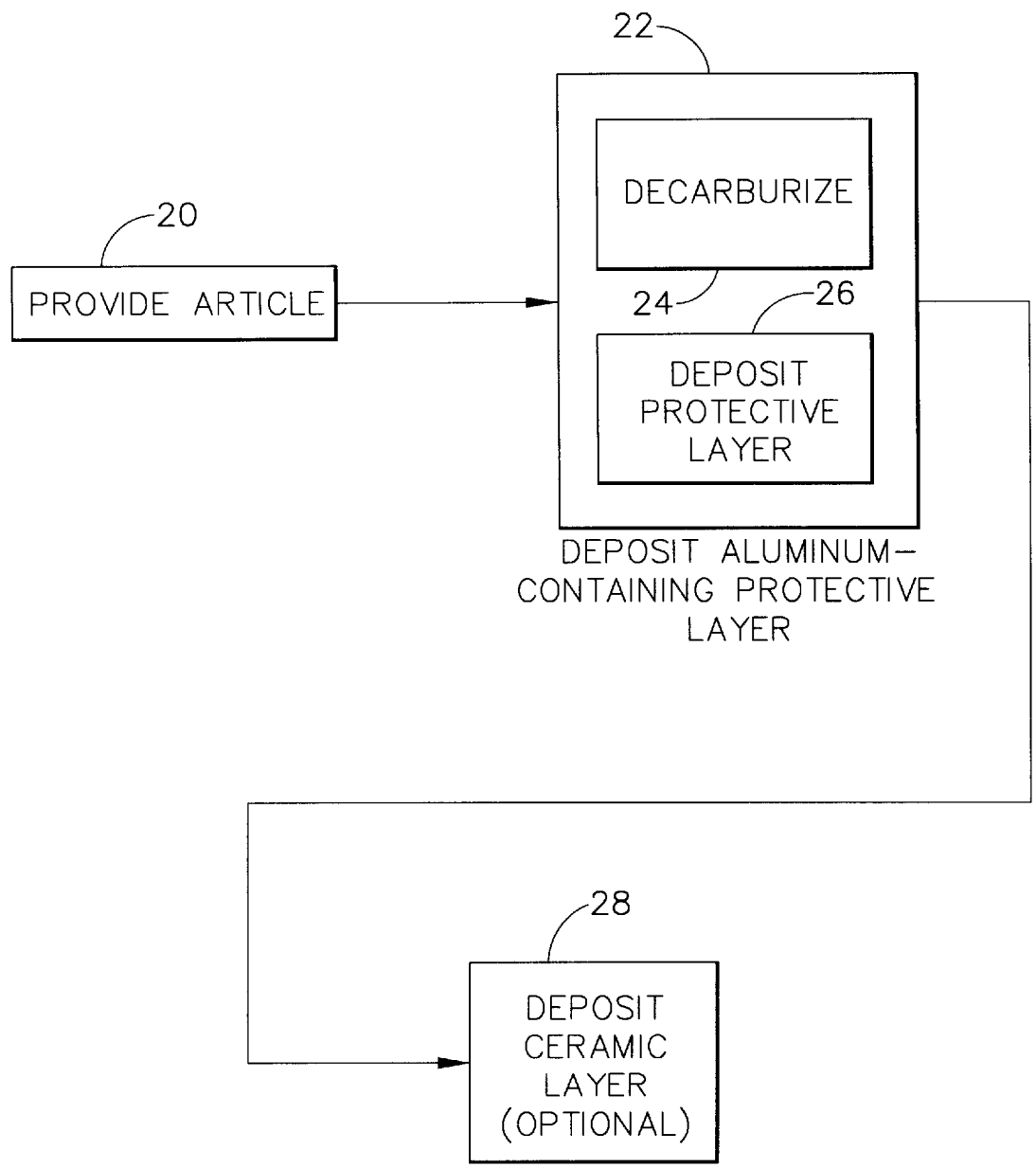
FIG. 1 is a block flow diagram generally illustrating an approach for practicing the invention.
Figure 2:
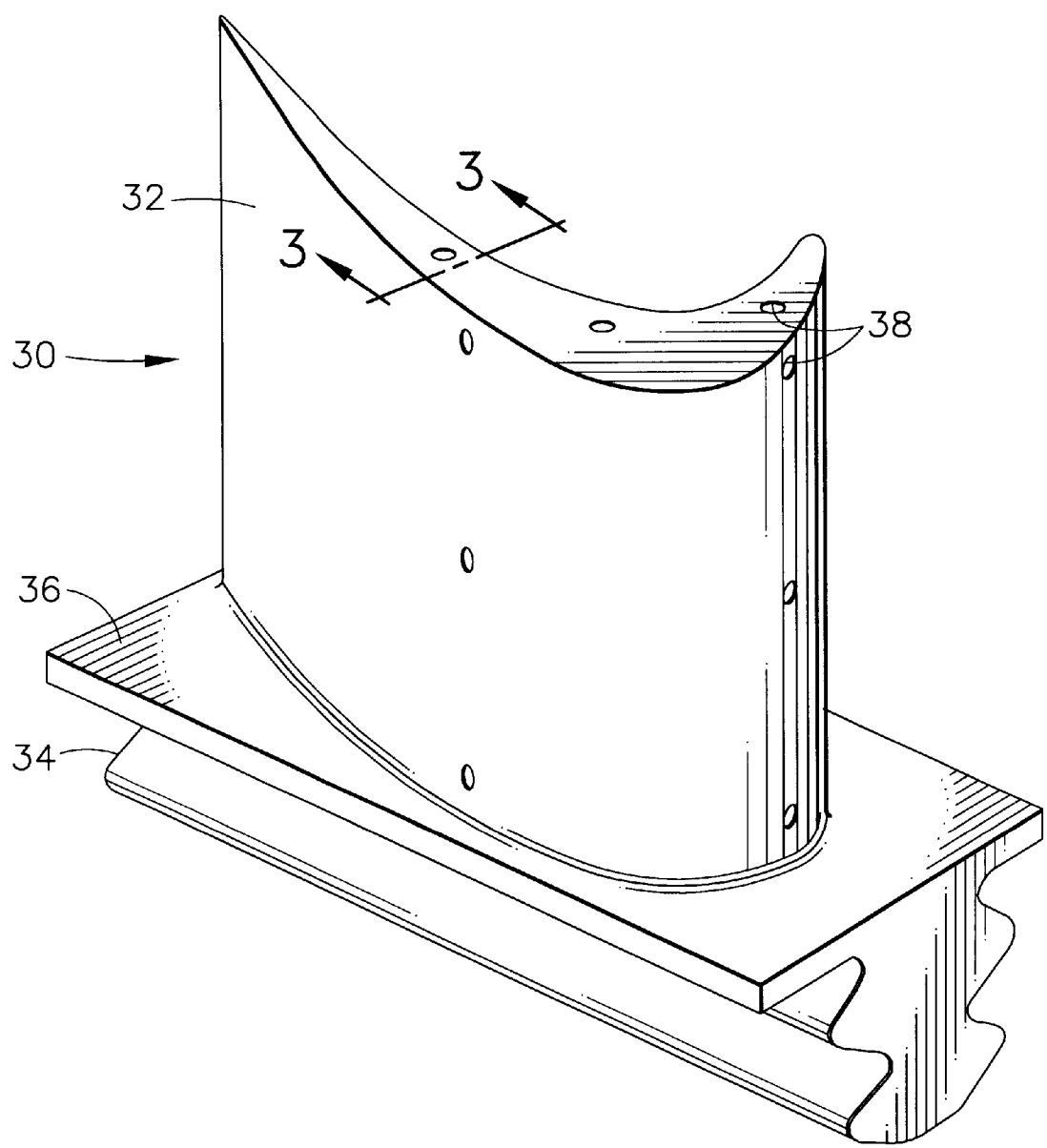
FIG. 2 is a perspective view of a gas turbine blade.

FIG. 1 depicts an approach for practicing the invention. An article is provided, numeral 20. The article serves as a substrate for a protective layer applied in a subsequent step. FIG. 2 depicts such an article in the form of a gas turbine blade 30. A turbine vane is similar in relevant aspects. The turbine blade 30 includes an airfoil 32 against which the flow of hot exhaust gas is directed. The turbine blade 30 is mounted to a turbine disk (not shown) by a dovetail 34 which extends downwardly from the airfoil 32 and engages a slot on the turbine disk. A platform 36 extends longitudinally outwardly from the area where the airfoil 32 is joined to the dovetail 34. A number of cooling channels may extend through the interior of the airfoil 32, ending in openings 38 in the surface of the airfoil 32. A flow of cooling air is directed through the cooling channels, to reduce the temperature of the airfoil 32.

The article is made of a nickel-base superalloy. "Nickel-base" means that the superalloy has more nickel than any other single element. The nickel-base superalloy is strengthened by the precipitation of gamma prime precipitates in a gamma matrix, and therefore includes gamma-prime forming elements.

The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

Examples of nickel-base superalloys operable with the invention include Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities; Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; and PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities. The practice of the invention is not limited to these alloys, which are provided as examples.

Referring again to FIG. 1, an aluminum-containing protective layer is deposited overlying the surface of the article, numeral 22. This step 22 has two substeps. One substep, numeral 24, includes decarburizing locations where the carbon, if present, would potentially chemically combine with the reactive elements in the protective layer. The other substep, numeral 26, includes depositing the protective layer. These two substeps 24 and 26 are represented generally within the overall step 22, because they may be performed in any order. That is, step 24 may be performed before, concurrently with, and/or after step 26. Specific procedures within each of these ordering alternatives will be discussed subsequently.

Figure 3:
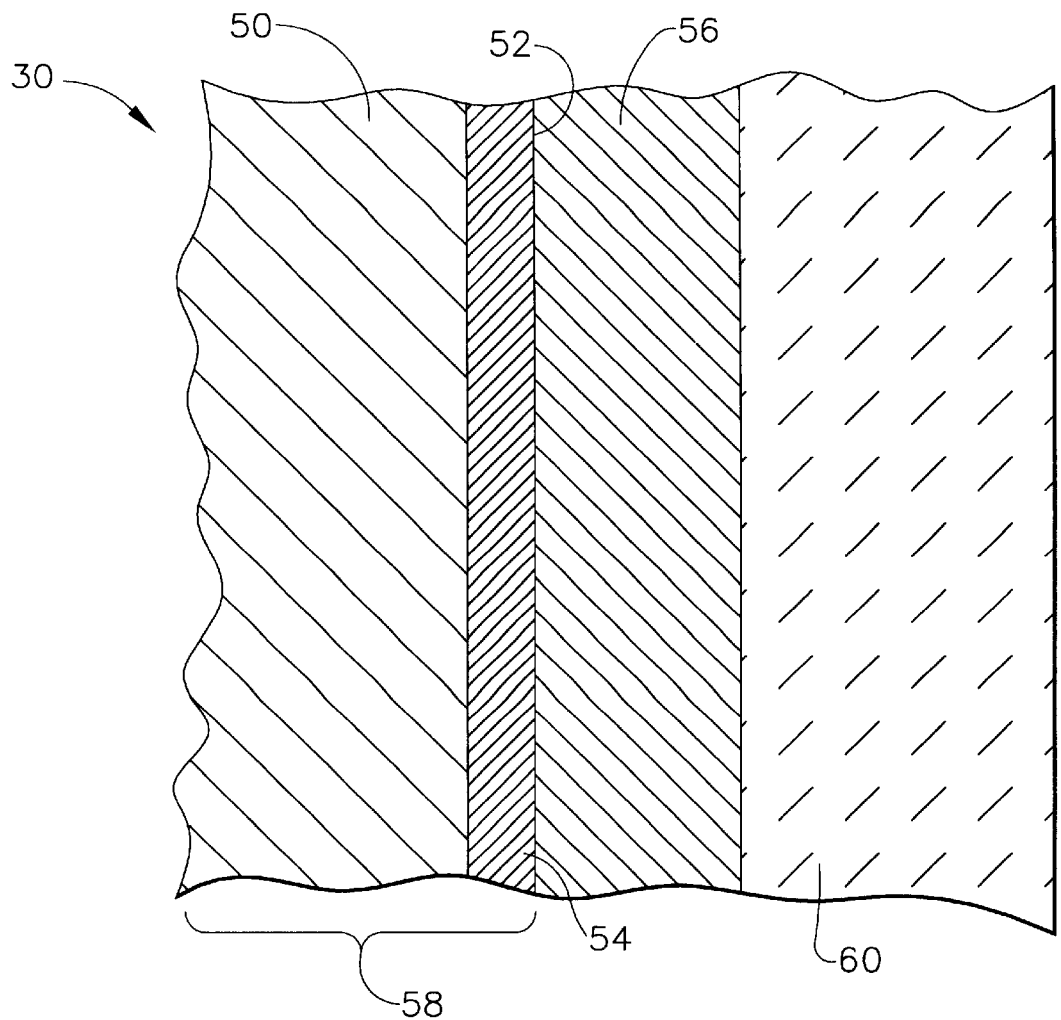
FIG. 3 is an enlarged sectional view through the gas turbine blade of FIG. 2, taken along line 3—3.

FIG. 3 (which is not drawn to scale) is an enlarged sectional view of the airfoil 32 of the turbine blade 30 (or the airfoil of a turbine vane) employing the present invention. The turbine blade 30 includes a bulk region 50 and a surface 52. This surface 52 is of the base turbine blade substrate, not including any overlying layers. There is a surface region 54 present in the bulk region 50, just below and adjacent to the surface 52. An aluminum-containing protective layer 56 overlies and contacts the surface 52. The turbine blade 30, constituting the bulk region 50, the surface region 54, and the surface 52, acts as a substrate 58 for the protective layer 56.

The protective layer 56 and desirably the surface region 54 have a low carbon content. The surface region 54 of the substrate is preferably depleted in carbon relative to the nominal bulk composition of carbon, by the decarburization process. The carbon content of the surface region 54 is less than that of the nominal bulk carbon content. In the case of Rene N5 alloy, for example, the nominal carbon content of the bulk region 50 is about 0.05 percent. The surface region 54 has a carbon content of less than 0.05 percent, preferably substantially less. It is preferred that the average carbon content of the surface region 54 and the protective layer 56 each be less than about 200 parts per million by weight. Desirably, the ratio of the reactive elements in the protective coating (as will be discussed subsequently) to carbon, on an atomic basis, exceeds about 50. If a greater amount of carbon is present, it poses too great a potential for diffusing into the protective layer 56 during heat treatments and/or service and chemically combining with the reactive elements.

The present approach provides that the protective layer 56 has a low carbon content, so that there is a reduced tendency of the reactive elements to chemically combine with the carbon and thus be immobilized. It also preferably provides that the surface region 54 of the substrate 58 has a reduced carbon content, so that it does not serve as a source of carbon atoms diffusing into the protective layer 56 during heat treatments and/or service.

The surface region 54 is preferably of a thickness of from about 5 to about 100 micrometers. The surface region 54 is defined as the region of reduced carbon content as compared with the bulk carbon content. Carbon contents for the surface region 54 are specified as an average value in the surface region, averaged over the thickness of the surface region. Similarly, carbon contents for the protective layer 56 are specified as an average value in the protective layer, averaged over the thickness of the protective layer.

The protective layer 56 may be of any operable type that contains a reactive element selected from the group consisting of hafnium, zirconium, yttrium, lanthanum, and cerium, and combinations thereof. The reactive element is present in the protective layer 56 in an amount exceeding about 0.1 weight percent. The reactive element in the protective layer 56 improves the creep strength of the protective layer 56 and also improves the aluminum oxide scale that forms on the protective layer. The reactive element also improves the FCT (furnace cycle testing) performance of the substrate/coating system. However, these beneficial effects are realized primarily when the reactive present is not chemically combined and is free to diffuse within the protective layer 56. The presence of carbon at locations where it would chemically combine with the reactive elements reduces the amount of the reactive element in solid solution. The present invention provides for reducing the carbon content in these locations.

In one form, the protective layer 56 comprises aluminum, at least one reactive element, and elements interdiffused into the protective layer 56 from the substrate 58. Because nickel is the element present in the substrate 58 in greatest abundance, the protective layer 56 comprises largely aluminum, nickel, and at least one reactive element as discussed above, plus other elements interdiffused into the protective layer 56 from the substrate 58. This embodiment of the protective layer is typically termed a "nickel aluminide" layer. The aluminum is typically present in an amount of from about 15 to about 32 weight percent, averaged through the protective layer 56.

In another form of the protective layer 56, a noble metal such as platinum is provided in the protective layer 56, so that its composition comprises aluminum, platinum, at least one reactive element as discussed above, and elements interdiffused into the protective layer 56 from the substrate 58. In a preferred form of this embodiment, the platinum is present in an average amount of from about 20 to about 30 weight percent, preferably from about 25 to about 28 weight percent, of the protective layer 56, and the aluminum is present in an average amount of from about 14 to about 25 weight percent, preferably from about 18 to about 22 weight percent, of the protective layer 56. The remainder of the protective layer 56 comprises elements interdiffused from the substrate 32, primarily nickel.

In a third form of the protective layer 56, the protective layer 56 comprises an MCrAlX overlay composition. The terminology "MCrAlX" is a shorthand term of art for a variety of families of overlay protective layers 56 that may be employed as environmental coatings or bond coats in thermal barrier coating systems. In this and other forms, M refers to nickel, cobalt, iron, and combinations thereof. The chromium content may vary generally in the range of from 0 to about 25 weight percent. The aluminum content is preferably from about 18 to about 30 weight percent, but lower levels of aluminum are operable. The X denotes elements such as hafnium, zirconium, yttrium, tantalum, rhenium, platinum, silicon, titanium, and boron, and combinations thereof. Specific compositions are known in the art. At least one reactive element is present, as discussed above.

In all three forms, the protective layer 56 is preferably from about 0.0005 to about 0.005 inches in thickness, but lesser or greater thicknesses are operable although less desirable.

After the aluminum-containing protective layer 56 is deposited, a ceramic layer 60 may optionally be deposited overlying and in contact with the protective layer 56, numeral 28 of FIG. 1. When there is no ceramic layer 60, the protective layer 56 may be described as an environmental coating. Where there is a ceramic layer 60, the protective layer 56 may be described as a bond coat, and the combination of the protective layer 56 and the ceramic layer 60 may be described as a thermal barrier coating system. The ceramic layer 60 is preferably yttria-stabilized zirconia, which is zirconium oxide containing from about 2 to about 12 weight percent, preferably from about 3 to about 8 weight percent, of yttrium oxide. The ceramic layer 60 is typically from about 0.003 to about 0.010 inch thick. It may be deposited by any operable technique, such as physical vapor deposition or thermal spray. Other operable ceramic materials may be used as well.

Returning to the discussion of the deposition of the aluminum-containing protective layer, step 22, in one embodiment the carbon content in the surface region 54 is reduced, step 24, prior to the deposition of the protective layer, step 26. In a preferred approach to accomplishing this decarburizing step 24, the turbine blade 30 is heated for a period of from about 1 to about 10 hours at a temperature of from about 1600° F. to about 2100° F. in a reducing atmosphere of hydrogen or carbon dioxide at a pressure of 1 atmosphere.

In another embodiment, the decarburizing step 24 is accomplished simultaneously or concurrently with the deposition step 26. In the case of a nickel aluminide protective layer 56, the source of aluminum is preferably a gaseous source, as in vapor phase aluminiding. A hydrogen halide gas, such as hydrogen chloride, is contacted with aluminum metal or an aluminum alloy to form the corresponding aluminum halide gas. Aluminide-modifying elements such as hafnium, zirconium, yttrium, lanthanum, cerium, silicon, titanium, tantalum, cobalt, chromium, platinum, and palladium may optionally be doped from similar sources into the gaseous source. A reducing gas such as hydrogen is mixed into the source gas, in a concentration exceeding about 1 percent by volume. The source gas is passed over the turbine blade 30. Aluminum, with any optional dopants included, is deposited onto the surface 52. The deposition reaction typically occurs at elevated temperature such as from about 1700° F. to about 2100° F. so that deposited aluminum atoms interdiffuse into the substrate 58, and atoms from the substrate diffuse into the protective layer 56. An aluminide coating about 0.002 inch thick may be deposited in about 4–8 hours using this approach. Other known and operable aluminum-deposition techniques such as pack cementation, above-the-pack aluminiding, slurry deposition, chemical vapor deposition (CVD), and organo-metallic chemical vapor deposition may also be used.

Where the protective layer 56 is a platinum aluminide, a platinum sublayer is first deposited on the surface 52. In one approach, the deposition is accomplished by electrodepositing platinum from a platinum-containing solution onto the surface 52. An operable platinum-containing aqueous solution is $Pt(NH_3)_4HPO_4$ having a concentration of about 4–20 grams per liter of platinum, and a voltage/current source is operated at about ½–10 amperes per square foot of facing article surface. The platinum sublayer about 5 micrometers thick is deposited in 1–4 hours at a temperature of 190–200°

F. After this thin platinum sublayer is deposited, carbon may be removed from both the surface region 54 and the platinum sublayer by heating the turbine blade 30 for a period of from about 1 to about 6 hours at a temperature of from about 1600° F. to about 2100° F. in a reducing atmosphere of hydrogen or carbon dioxide at a pressure of about 1 atmosphere. The aluminum layer is thereafter deposited overlying the platinum layer as described above, with or without the use of a reducing gas in the aluminum-deposition step.

The starting materials of the protective layer 56 may instead be decarburized prior to their deposition, so that their total carbon content is reduced as compared with their normal carbon content. This approach is particularly effective where the protective layer 56 is an overlay. Decarburization of the starting materials may be accomplished in a reducing atmosphere such as hydrogen or carbon dioxide.

In another but less preferred embodiment, the decarburizing step 24 is accomplished after the deposition step 26 is completed. In this case, the turbine blade 30, with the protective layer 56 in place, is heated for a period of from about 1 to about 10 hours at a temperature of from about 1600° F. to about 2100° F. in a reducing atmosphere of hydrogen or carbon dioxide at a pressure of about 1 atmosphere.

The decarburizing step 24 may thus be accomplished before, during, and/or after the deposition step 26. These different techniques may be, and preferably are, used together, as for example by performing decarburization 24 before, during, and after the deposition step 26 in order to assure maximum carbon removal from the surface region 54 and in the protective layer 56.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

What is claimed is:

1. A method for preparing a surface-protected nickel-base superalloy article, comprising the steps of
    providing an article substrate having a surface and having
        a nominal bulk composition comprising the nickel-base superalloy, the nickel-base superalloy comprising more nickel than any other element, and
        a nominal bulk composition of carbon; and
    depositing a protective layer overlying the surface of the article substrate, the protective layer comprising aluminum and a reactive element selected from the group consisting of hafnium, zirconium, yttrium, lanthanum, and cerium, and combinations thereof, the step of depositing a protective layer including steps of
        decarburizing locations where the carbon may serve as a barrier to the mobility of the reactive elements within the protective layer, and thereafter
        depositing the protective layer overlying the substrate, the step of depositing to occur after the step of decarburizing.

2. The method of claim 1, wherein the step of decarburizing includes the steps of
    depositing a platinum-containing layer overlying the substrate, thereafter
    decarburizing the platinum-containing layer, and thereafter
    depositing the protective layer overlying the platinum-containing layer.

3. The method of claim 1, wherein the protective layer is a diffusion coating.

4. The method of claim 1, wherein the protective layer is an overlay coating.

5. The method of claim 1, including an additional step, after the step of depositing a protective layer, of
    depositing a ceramic layer overlying the protective layer.

6. A method for preparing a surface-protected nickel-base superalloy article, comprising the steps of
    providing an article substrate having a surface and having
        a nominal bulk composition comprising the nickel-base superalloy, the nickel-base superalloy comprising more nickel than any other element, and
        a nominal bulk composition of carbon; and
    depositing a protective layer overlying the surface of the article substrate, the protective layer comprising aluminum, platinum, and a reactive element selected from the group consisting of hafnium, zirconium, yttrium, lanthanum, and cerium, and combinations thereof, the step of depositing a protective layer including steps of
        depositing a platinum-containing layer overlying the substrate, thereafter
        decarburizing the platinum-containing layer, and thereafter
        depositing an aluminum-containing layer overlying the platinum-containing layer.

7. The method of claim 6, including an additional step, after the step of depositing a protective layer, of
    depositing a ceramic layer overlying the protective layer.

* * * * *